Nov. 25, 1930.  A. BIRON  1,783,106
SIGNAL SWITCH FOR DISPENSING APPARATUS
Filed June 26, 1928
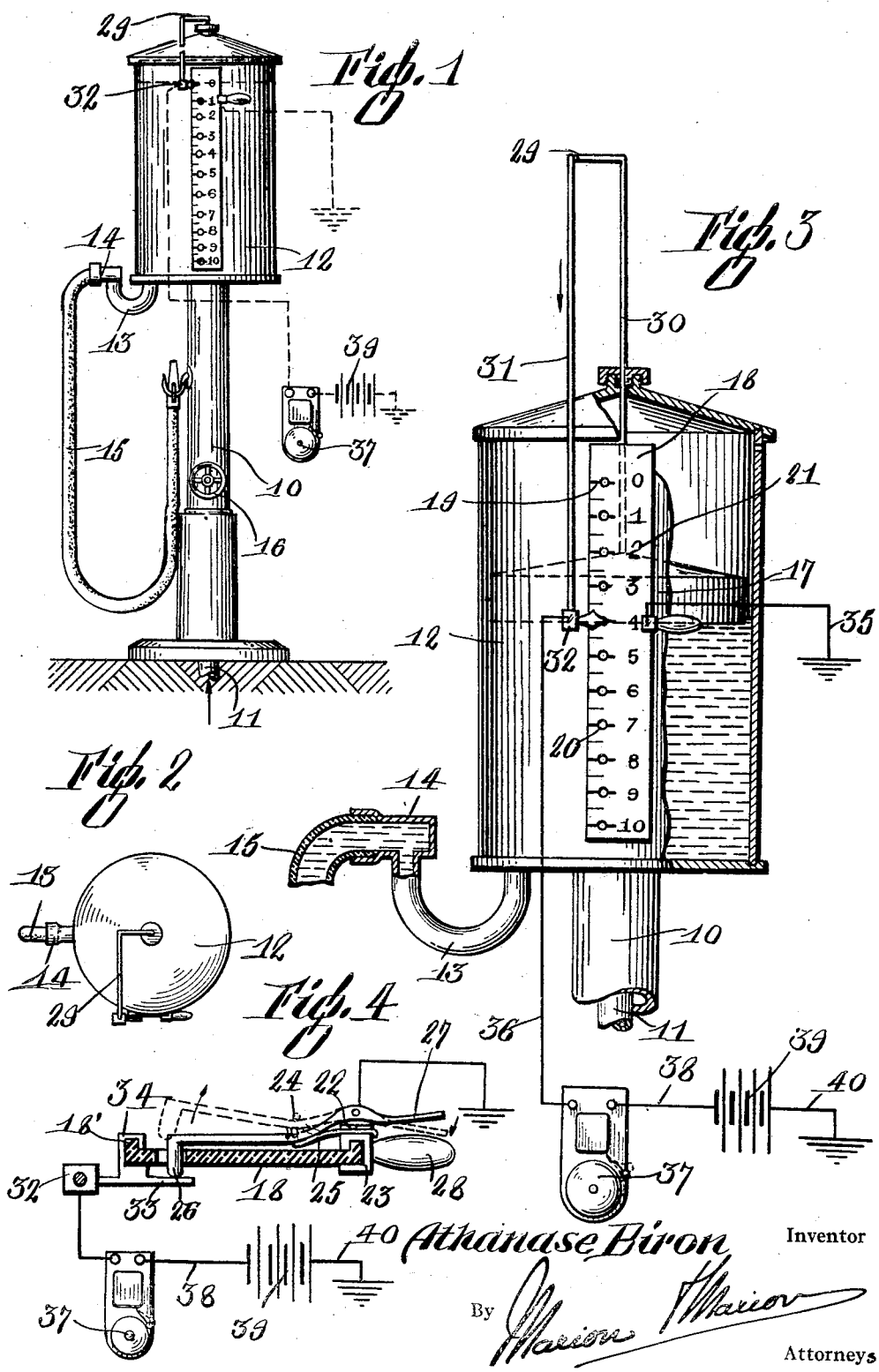
Athanase Biron Inventor
By Marion & Marion Attorneys Patented Nov. 25, 1930

1,783,106

UNITED STATES PATENT OFFICE

ATHANASE BIRON, OF MONTREAL, QUEBEC, CANADA

SIGNAL SWITCH FOR DISPENSING APPARATUS

Application filed June 26, 1928. Serial No. 288,330.

The present invention relates to improvements in dispensing apparatus and has particular reference to an automatic signal therefor.

An important object of the invention is the provision of a signalling device adapted to automatically indicate the predetermined liquid level in a dispensing apparatus.

A further object of the invention is the provision of a signal which will automatically sound an audible or visual signalling device when a predetermined quantity of liquid has been dispensed from a gasolene or similar dispensing apparatus.

Another object of the invention is the provision of a signal embodying a manually adjustable member and an automatically operable member adapted to operate a signal when the liquid level of a dispenser reaches a predetermined position.

Another object of the invention is the provision of an electrically operated signal for gasolene dispensing apparatus designed to indicate to the operator the discharge of a predetermined quantity of fuel.

Still another object of the invention is the provision of a signalling device of the above character which will be simple in construction and reliable in operation.

Other objects and advantages of the invention will become apparent as the description progresses.

In the accompanying drawing forming a part of this specification and in which like reference characters are employed to designate corresponding parts throughout the same:

Figure 1 is a front elevational view of the assembled apparatus,

Figure 2 is a top plan view of the same,

Figure 3 is an enlarged front elevational view, partly in section, and

Figure 4 is a transverse sectional view through the signalling structure.

Referring to the drawing, wherein for the purpose of illustration is shown a preferred embodiment of the invention, the numeral 10 generally designates a tubular standard through the centre of which is disposed a fuel supply conduit 11 adapted to deliver gasolene or other liquid to a container or dome 12.

The container 12 is in the form of a cylindrical covered casing formed with an aperture in the top thereof. Heretofore, the reservoir or dome embodied a waist portion formed of glass or other transparent material. In the present instance, the casing may, however, be formed of sheet metal or like construction. The fuel is discharged from the dome through a semi-circular fitting 13, attached to the bottom in an offset position and provided with an elevated nozzle 14. Connected to the nozzle 14, for conducting the fuel to the tank of an automobile, is a flexible conduit or hose 15. As shown to advantage in Figure 1, the supply of fuel to the dome 12 is regulated by means of a valve 16.

Mounted for vertical reciprocating movement in the dome is a float 17, preferably embodying a cylindrical buoyant casing adapted to float on the upper surface of the liquid in the reservoir.

An essential feature of the present invention is the provision of an indicating mechanism designed to automatically operate a signal when the liquid level in the reservoir attains a predetermined position, after the delivery of liquid therefrom. With this in mind, I provide a graduated scale embodying a flat elongated scale board 18 attached vertically to the front of the dome, as shown to advantage in Figures 1 and 3. This scale is formed with uniformly spaced graduations 19 through which are formed openings 20. The graduations are designated by numerals 21 arranged in successive series from the upper to the lower portion of the scale adapted to indicate volume measurement in gallons or the like.

As illustrated in Figure 4, the longitudinal side portions of the scale board 18 are formed with inwardly projecting flanges 18' formed at their longitudinal marginal edges to form suitable guides.

Slidably associated with one edge of the scale board 18, for longitudinal movement thereon, is an adjustable indicating member 22 embodying a substantially rectangular shaped bracket 23 embracing one longitudinal edge of the board and the flange thereof. Attached to the inner side of the bracket, for transverse swinging movement, is an arm 24 pivotally connected with the bracket and extending transversely across the inner side of the board and normally urged inwardly toward the board by means of a spring 25. The inner end of the arm 24 carries a right angular, horizontally extending contact pin 26 adapted to normally project through the openings 20 when in alignment therewith. The outer end of the arm is provided with a trigger 27 by means of which the arm may be swung outwardly to remove the contact pin 26 from the openings 20 to slidably adjust the same. The bracket 23 carries a laterally extending handle 28 by means of which the member 22 can be selectively adjusted in vertical position.

An inverted U-shaped frame 29 is attached to the float 17 and movable therewith, this frame embodying a metallic rod bent to form an inner vertical leg 30 adapted to reciprocate through the opening in the top of the receptacle and having its lower extremity rigidly fixed on the top of the float. The frame also embodies an outer leg 31 arranged to reciprocate vertically at the outer side of the dome and carrying at its lower end a block 32. Formed integral with the block and projecting transversely over the front face of the board 18 is a tapered pointer 33 arranged to contact with the outer extremity of the pin 26 when the same is extended through a predetermined aperture 20. The pointer 33 carries a guide bracket 34 embracing the longitudinal edge of the board and the flange 18' formed on one side thereof so that the pointer will traverse a definite vertical path.

An electric conductor 35 is connected with the manually adjustable bracket 23, the opposed end thereof being grounded. A second conductor 36 is connected to the block 32 and with an audible signal, comprising in the present instance an electric bell 37. The circuit is then continued through a conductor 38 to a battery 39 and is then grounded through a wire 40. Thus, when the pointer 33 engages the pin 26 the electric circuit will be closed to operate the audible signal 37.

In operation, the receptacle or dome 12 is initially filled through the supply conduit 11. The operator then vertically adjusts the member 22 to a position corresponding with the volume of gasoline to be dispensed. He then arranges the flexible conduit 15 to conduct the fuel to the vehicle tank. As the liquid level in the dome is lowered, due to its discharge through the flexible conduit, the float 17 will also be lowered within the dome simultaneously lowering the frame 29 and pointer 33. When the pointer engages the outwardly projecting end of the pin 26, which is extended through a predetermined aperture 20, the normally open electric circuit will be closed to operate the signal and thus inform the operator that the predetermined quantity of fuel has been discharged from the dome.

Thus, the work of the station operator will be substantially simplified and the gasolene or other liquid fuel dispensed uniformly and accurately to insure proper distribution of the fuel. Furthermore, the necessity for providing the relatively fragile glass domes is obviated so that a more durable metallic structure can be effectively employed.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

An electric switch adapted to be used in combination with a liquid dispensing device, comprising an insulated panel having a plurality of apertures therein, a member movable along one edge of the panel and actuated by suitable means associated with the dispensing device, a second member also movable along the other edge of the panel and having a handle, a lever pivoted to said member and adapted to protrude through the panel apertures, and spring means to urge the lever to an aperture engaging position, the first and second members being connected to an electric source in series with a signalling device.

In witness whereof I have hereunto set my hand.

ATHANASE BIRON.